United States Patent Office 3,485,867
Patented Dec. 23, 1969

3,485,867
STABILIZATION OF DIMETHYL TEREPHTHALATE
James Augustus Jackson, Chicago, Ill., assignor to Standard Oil Company, Chicago, Ill., a corporation of Indiana
No Drawing. Filed Dec. 14, 1966, Ser. No. 601,571
Int. Cl. C07c 69/82
U.S. Cl. 260—475   4 Claims

ABSTRACT OF THE DISCLOSURE

Suppression of acid number increase and obtention of thermal stability of molten dimethyl terephthalate by addition thereof of 0.01 to 1.0 weight percent ethylene glycol.

---

This invention pertains to the thermal stabilization of dimethyl terephthalate. More specifically, this invention pertains to the stabilization of melted dimethyl terephthalate against acid number increase with a unique additive and to the novel stabilized composition comprising dimethyl terephthalate and additive.

Dimethyl terephthalate (DMT) is still used commercially as a highly pure form of terephthalic acid for the preparation of high molecular weight film, fiber and mono-filament forming polyesters from diols, such as ethylene glycol. For such use DMT is first reacted with the diol, e.g. ethylene glycol, under ester interchange conditions to form bis (hydroxyalkyl) terephathlate or mixtures of bis (hydroxyalkyl) terephthalate and low molecular weight condensation products such as dimers, trimers and tetramers of bis (hydroxyalkyl) terephthalate. Then the bis (hydroxyalkyl) terephthalate is heated under reduced pressure, down to as low as 0.05 to 0.1 mm. Hg absolute in the absence of oxygen under polycondensation conditions where diol is given off and is removed as condensation progresses until the desired molecular weight polyester has formed. To be useful as a starting material for the ester interchange reaction, DMT must be of 99.9 percent and higher purity because impurities introduced with the DMT have a substantial adverse effect on both polyester color and strength as fibers or films.

One commercially accepted purity specification for highly pure DMT is the acid number of molten DMT held at 175° C. The acid number is the number of milligrams of KOH required to neutralize free acid in one gram of DMT. High purity DMT is commercially acceptable for the ester interchange reaction when the DMT has an acid number of 0.1 or less, preferably 0.05 and lower after being held in the molten state at 175° C. for at least 4 hours. There is a reason for setting the acid number of molten DMT held at 175° C. The manufacturers of high molecular weight polyalkylene terephthalates for film and fiber production usually store DMT as a melt for feed to the ester interchange reaction rather than storing such difficultly transferable solid forms of DMT as powders, flakes, pellets or briquettes. Customarily an amount of melted DMT feed supply is maintained for 24 to 36 hours ester interchange use and fresh solid DMT is added to the stored melt from time to time. Some melted DMT can have a residence time in melt feed storage of 72 hours although there is substantially continuous use of melted DMT and periodic addition of fresh DMT to melt DMT storage. It appears that as the acid number increases beyond a certain value for the DMT melt longest in feed storage, the acid number value of the entire amount of feed melt increases rapidly. Thus a large amount of DMT feed melt becomes unsuitable for ester interchange use and must be returned for reprocessing or discarded. For this reason it is important to evaluate the melt stability of DMT held at 175° C. by determining the extent of acid number increase over such periods of time as 24 and 72 hours.

Highly pure, 99.9% and above purity, DMT is prepared by esterifying terephthalic acid with an excess of methanol which is also the solvent for crude DMT. A crude DMT product is obtained by crystallization from the methanol mother liquor. The crude DMT can be partially purified by recrystallization from xylene or methanol. The partially purified DMT (melting point about 140° C.) is melted and distilled under fractionating conditions to recover a heart-cut fraction of 99.9 percent and higher purity. The fore-cut fraction and a portion of the bottoms fraction are reprocessed to recover DMT values. DMT of high purity is also recovered from the oxidation of p-xylene to p-toluic acid, esterification of p-toluic acid with methanol, oxidation of p-methyl toluate to mono-methyl terephthalate, esterification of that monomethyl ester to crude DMT and then purifying the crude DMT generally by a final fractionation and/or by several recrystallizations.

Unless some stabilizing addition agent is added to the highly purified DMT product, the melt of purified DMT held at 175° C. for 24 to 72 hours develops an acid number well above 0.1. The acid number of freshly recovered highly pure (i.e. 99.9% and higher purity) DMT may be as low as about 0.01. But when held at a melt at 175° C. for 24 to 72 hours the DMT having an initial acid number of about 0.01 will develop an acid number of 0.05 to 4.0 depending upon the source of DMT and its final purification treatment. The acid number increase of the melt is slower for DMT purified by recrystallization, fractionation and a final recrystallization from methanol of the heart-cut fraction from distillation, than for DMT whose final purification is by fractionation.

The acid number increase for DMT melt has been thought to occur by some oxidative attack of one of the methyl ester groups. For this reason there have been used and proposed for use as acid number stabilizing addition agents such compounds as hindered phenols especially tertiary-butyl phenol, alkyl phosphites, and combinations of hindered phenols and alkyl phosphites among others. The hindered phenols are known to be antioxidants but the alkyl phosphites are not as a rule antioxidants. Not all compounds having anti-oxidant properties are equally effective to stabilize DMT melt against acid number increase.

I have discovered that a DMT melt can be stabilized against acid number increase by the addition to highly pure DMT (99.9% and above purity) of a small amount of ethylene glycol. As will be demonstrated later the amount of ethylene glycol added should not exceed about 1% and can be as low as 0.01% by weight of DMT. The maximum weight level of 1.0 weight percent ethylene glycol represents 3.061 mole percent impurity and would depress the melting point of DMT (based on empirical cryoscopic constant of 1.44 mole percent/° C.) about 2.13° C. But the ethylene glycol additive impurity is also the reactant most widely used with DMT in the ester interchange step in the route to polyethylene terephthalate high molecular weight commercial polyesters for film, fiber and mono-filament production and thus does not represent an undesirable impurity from the standpoint of adverse effect on final polyester color, molecular weight or strength.

The acid number stabilizing effect of ethylene glycol for highly pure DMT is illustrated by the following data obtained from the use of DMT of a purity of 99.99% with from 1% to 0% ethylene glycol by weight held as a melt at 175° C. The initial acid number and acid numbers for 24 and 72 hours at 175° C. are given. These acid numbers are the number of milligrams of KOH required to neutralize free acid in one gram of DMT sample. The DMT was obtained heart-cut from esterification of terephthalic acid with methanol, recrystallization of crude DMT and fractionation of recrystallized DMT.

ACID NUMBER OF DMT MELT AT 175° C.

| Ethylene glycol added, wt. percent | 0 | 0.03 | 0.06 | 0.1 | 0.25 | 0.5 | 1.0 |
|---|---|---|---|---|---|---|---|
| Acid number, mg. KOH/g.: | | | | | | | |
| Initial | 0.012 | 0.009 | 0.010 | 0.012 | 0.012 | 0.012 | 0.012 |
| 24 hours | 1.43 | 0.025 | 0.015 | 0.028 | 0.025 | 0.024 | 0.038 |
| 72 hours | 3.84 | 0.029 | 0.021 | 0.028 | 0.039 | 0.046 | 0.075 |

It will be noted that the use of 1.0% ethylene glycol gives a 72 hour acid number that is marginally acceptable but above the preferred upper limit of 0.05. It will also be noted that the 72 hour acid number decreases with a decrease in concentration of ethylene glycol. This is in itself unusual. It would be thought that an increase in use of an effective acid number stabilizing agent would shop greater ability to stabilize the acid number increase, i.e. result in lower acid numbers as the additive concentration is increased. But the above data show the reverse to be the case. The use of less than about 0.01% ethylene glycol is not effective in stabilizing the acid number of DMT melt held at 175° C. It is preferred to use ethylene glycol additive in the range of 0.01 to 0.5 weight percent based on the highly pure DMT on the basis of the foregoing data.

The foregoing acid number stability test of DMT melt at 175° C. when conducted with heart-cut of freshly distilled DMT obtained by oxidation of p-xylene to p-toluic acid esterification of p-toluic acid with methanol, oxidation of p-methyl toluate and esterification of monomethyl terephthalate gives results substantially the same as shown above.

What is claimed is:

1. A composition consisting essentially of dimethyl terephthalate of 99.9% and higher purity and in the range of 0.01 to 1.0 percent by weight ethylene glycol based on dimethyl terephthalate.

2. The composition of claim 1 wherein the ethylene glycol content is in the range of 0.01 to 0.5 percent by weight.

3. The method of stabilizing acid number increase of dimethyl terephthalate of 99.9% and higher purity where held at 175° C. for 24 to 72 hours which comprises adding to said highly pure dimethyl terephthalate ethylene glycol in the range of 0.01 to 1.0 percent by weight based on the highly pure dimethyl terephthalate.

4. The method of claim 3 wherein the added ethylene glycol is in the range of 0.01 to 0.5 percent by weight.

References Cited

UNITED STATES PATENTS 2,945,788   7/1960   Watzl _____ 260—475

LORRAINE A. WEINBERGER, Primary Examiner

E. J. SKELLY, Assistant Examiner